United States Patent
Loussert et al.

(10) Patent No.: US 9,886,604 B2
(45) Date of Patent: Feb. 6, 2018

(54) METHOD OF DISCRIMINATING RFID TAGS IN MOTION FROM STATIC RFID TAGS

(71) Applicants: TAGSYS, La Ciotat (FR); UNIVERSITE PARIS 6 PIERRE ET MARIE CURIE, Paris (FR); CENTRE NATIONAL DE LA RECHERCHE SCIENTIFIQUE, Paris (FR); UNIVERSITE AMIENS PICARDIE JULES VERNE, Amiens (FR)

(72) Inventors: Christophe Loussert, Aix en Provence (FR); Brigitte Kervella, Saveuse (FR); Mario Antônio Zancanaro, Erechim-RS (BR); Mauro Sergio Pereira Fonseca, Curitiba (BR); Niamba Jean-Michel Akre, Gagny (FR); Anne Fladenmuller, Boulogne (FR); Sébastien Baey, Antony (FR)

(73) Assignees: TAGSYS, La Ciotat (FR); UNIVERSITE PARIS 6 PIERRE ET MARIE CURIE, Paris (FR); CENTRE NATIONAL DE LA RECHERCHE SCIENTIFIQUE, Paris (FR); UNIVERSITE AMIENS PICARDIE JULES VERNE, Amiens (FR)

( * ) Notice: Subject to any disclaimer, the term of this patent is extended or adjusted under 35 U.S.C. 154(b) by 0 days.

(21) Appl. No.: 15/516,601

(22) PCT Filed: Oct. 2, 2015

(86) PCT No.: PCT/FR2015/052653
§ 371 (c)(1),
(2) Date: Jul. 17, 2017

(87) PCT Pub. No.: WO2016/051112
PCT Pub. Date: Apr. 7, 2016

(65) Prior Publication Data
US 2017/0351885 A1    Dec. 7, 2017

(30) Foreign Application Priority Data

Oct. 3, 2014 (FR) ....................... 14 59488

(51) Int. Cl.
*G06K 7/10* (2006.01)

(52) U.S. Cl.
CPC ..... *G06K 7/10138* (2013.01); *G06K 7/10108* (2013.01); *G06K 7/10128* (2013.01); *G06K 7/10435* (2013.01)

(58) Field of Classification Search
None
See application file for complete search history.

(56) References Cited

U.S. PATENT DOCUMENTS

2015/0269818 A1* 9/2015 Jain ............ G08B 13/248
340/572.1

FOREIGN PATENT DOCUMENTS

| EP | 1 734 662 A1 | 12/2006 |
|---|---|---|
| WO | 2009/055839 A1 | 5/2009 |
| WO | 2011/009767 A2 | 1/2011 |

OTHER PUBLICATIONS

French Search Report and Written Opinion issued in French application No. 1459488 dated Jul. 2, 2015.

(Continued)

*Primary Examiner* — Kristy A Haupt
(74) *Attorney, Agent, or Firm* — Kenealy Vaidya LLP

(57) ABSTRACT

Some embodiments are directed to a method and a system allowing moving tags to be discriminated from stationary tags, which can be used in the field of tracking merchandise or objects provided with RFID tags.

9 Claims, 4 Drawing Sheets

(56) References Cited

OTHER PUBLICATIONS

International Search Report and Written Opinion issued in PCT/FR2015/052653 dated Dec. 21, 2015 (with English Translation).

* cited by examiner

US 9,886,604 B2

METHOD OF DISCRIMINATING RFID TAGS IN MOTION FROM STATIC RFID TAGS

CROSS REFERENCE TO RELATED APPLICATIONS

This application is a National Phase filing under 35 C.F.R. § 371 of and claims priority to PCT Application No.: PCT/FR2015/052653, filed on Oct. 2, 2015, which claims the priority benefit under 35 U.S.C. § 119 of French Application No.: 1459488, filed on Oct. 3, 2014, the contents of which are hereby incorporated in their entireties by reference.

BACKGROUND

Some embodiments relate to a method and a system allowing moving tags to be discriminated from stationary tags, which can be used in the field of tracking merchandise or objects provided with RFID tags.

Geolocating merchandise by providing it with RFID tags that can be interrogated remotely by reading stations is known. The RFID tags can be read at various stages of the process of manufacturing or delivering the merchandise. They are, for example, read upon exiting the manufacturing unit in order to determine the merchandise that exits this unit and upon arrival in the warehouse of a client in order to determine the merchandise that is received by the client.

This merchandise is generally stacked in boxes and the boxes are moved via conveyors in the manufacturing unit or the receiving warehouse. The identification of the incoming or outgoing merchandise is carried out while it is present on the conveyor and is in motion. The difficulty is thus that of a reading station positioned near the conveyor only reading the moving tags present on the conveyor and not the tags possibly present in the surrounding environment of the conveyor. Indeed, since the signals used for reading the tags are UHF signals, it is very difficult to limit the reading zone to a well-defined volume around the conveyor because of the reflection of the UHF signals on walls of the surrounding environment and the generation of multipaths. The various paths of the response signals of a tag can thus add up and make it seem that this tag is in the reading zone. As a result, certain stationary tags distant from the conveyor can be read as being present on the conveyor.

In order to reduce these errors, it is possible to make the merchandise present on the conveyor pass through a metal tunnel and place the antennas of the reading station inside this tunnel. However, errors persist because the UHF signals can enter and exit the tunnel through its two ends.

The only known effective way that allows only the tags moving on the conveyor to be read is to set up a completely free (not containing tags or walls) security zone of approximately 50 m² around the reading station, which requires having space.

Another problem is also that of being able to discriminate between the tags present in a box and other tags present in other boxes positioned downstream or upstream on the conveyor. A simple solution involves spacing apart the boxes on the conveyor, with a space of approximately 10 meters between two consecutive boxes, which is not at all acceptable in terms of conveying performance.

To solve this problem, international application WO2009/055839, filed by the present applicant, proposed temporally analysing the RSSI (Received Signal Strength Indication) level of the response signals of the tags in order to determine the moving tags and the stationary tags. It was noted that the moving tags each had an RSSI peak when passing in front of a reading station, whereas the RSSI level of the stationary tags was rather stable. Moreover, the moving tags having simultaneous RSSI peaks are the tags contained in the same box. This detection via temporal analysis of the RSSI levels of the tags allowed the distance between two consecutive boxes to be reduced and changed from 10 meters to 2 meters. However, in certain situations, stationary tags can have an RSSI peak and be counted as moving tags. Indeed, certain changes in the environment (a door that is opened, a person that moves, . . . ) can create, at a given instant, constructive interference (addition of a plurality of paths) that thus causes an RSSI peak. The only solution for preventing this thus remains the creation of the 50 m² security zone.

SUMMARY

Some embodiments are directed to a method and a system allowing moving tags to be reliably differentiated from stationary tags without requiring a security zone around the reading station.

For this purpose, some embodiments perform the following: using at least two remote reading stations placed along the moving path, each emitting separate interrogation signals, and verifying whether the emission of these two interrogation signals causes the same event, for example the reception of a response signal from the tag by each of the reading stations, the presence of an RSSI peak or an increase in phase between the interrogation signal emitted and the response signal received. Indeed, the stationary tags that pose a problem are those that, at a given instant, cause constructive interference in the reading station. This phenomenon appears randomly, and the probability of it reappearing a second time in a second reading station is very low. Consequently, if this event (reception of a response signal from the tag, RSSI peak or increase in phase) is not detected in one of the two reading stations, this tag can be considered to be stationary.

More specifically, some embodiments are directed to a method for processing a plurality of RFID tags, intended to discriminate between moving tags and stationary tags, including:

transmitting, from first and second remote reading stations placed along the path of the moving tags, a first and a second radiofrequency interrogation signal to said plurality of RFID tags, determining whether said first and second reading stations receive response signals from tags in response to said first and second radiofrequency interrogation signals, respectively, in such a way that, for a current tag, if only one of said first and second reading stations receives a response signal from said current tag, said current tag is a stationary tag, and if said first and second reading stations each receive a response signal from said current tag, a shape recognition method is used to determine whether the current tag is stationary or moving.

According to some embodiments, a first sorting is thus carried out on the basis of the response signals received by the reading stations. A response signal received by a reading station is understood as a response signal that can be read by the reading station. The response signal received by a reading station is therefore a response signal having a level greater than the receivability and reading level of the reading station. The tags for which only one of the two reading stations receives a response signal are either stationary tags present in the reading zone of one of the reading stations or stationary tags in present outside of the reading zone of the stations and having a received response signal that comes from one or more indirect paths. The probability of the conditions being met for such an indirect path to be established between a stationary tag located outside of the reading zone and one of the reading stations is low. Moreover, the probability of this phenomenon being reproduced identically at two distinct reading points (corresponding to the two reading stations) is even more improbable and rare. This first sorting thus allows a first portion of the stationary tags to be discriminated.

The method for recognition via learning allows the moving tags to be discriminated from the other stationary tags.

According to a particular embodiment, the method for recognition via learning is the k-nearest neighbours, k being an integer greater than or equal to 1. The tags read by the two reading stations are discriminated by a k-nearest neighbours' method.

According to a particular embodiment, the k-nearest neighbours' method includes the following steps:
   a step of learning on a population of N tags, called learning tags, the state of which, stationary or moving, is known, wherein a signal representative of the response signals received by said first and second reading stations for each of said N learning tags are recorded,
   a step of selecting the k learning tags having the recorded response signals that are the closest to the response signals received for a current tag according to a predetermined distance criterion, and
   a step of determining the stationary or moving state of the current tag on the basis of the state of the k learning tags selected.

In this embodiment, k is advantageously an odd number. If among the k learning tags selected, the number of moving tags is greater than the number of stationary tags, the current tag is then considered to be a moving tag. If the opposite is true, it is considered to be a stationary tag.

Alternatively, k is an even or odd integer. The state, stationary or moving, of the current tag is determined from the distance calculated for the k learning tags.

According to a particular embodiment, in order to select the k learning tags, said response signals of the current tag and the response signals of the N learning tags are compared over a time window having a predetermined length synchronised on a predetermined time reference.

According to a particular embodiment, the length of the time window is determined on the basis of the speed of the moving tags and/or their minimum distance to said first and second reading stations. This embodiment is more particularly suited to the case in which the moving tags move on a conveyor having a constant speed.

According to a particular embodiment, the time reference is the crest of a peak of the RSSI level of the response signals and the time window is centred on said crest.

According to another embodiment, the time reference is provided by a device upstream of said first and second reading stations, said time reference marking the beginning of the time window.

According to a particular embodiment, with the time window being divided into M sub-windows, the learning step further includes, for each of the learning tags, a step of calculating characteristic values representative of the response signals received during each of said M sub-windows by said first and second reading stations, and the step of comparing the response signals of a current tag and the response signals of the learning tags includes:

a step of calculating, for the current tag, characteristic values representative of the response signals received during each of said M sub-windows by said first and second reading stations, and
a step of calculating distance between the characteristic values of the current tag and the statistical values of each of the N learning tags,
the k learning tags selected being the k learning tags having the smallest calculated distances.

According to a particular embodiment, the characteristic value calculated for each of the sub-windows belongs to the following group:
   the average of the RSSI level of the response signals of the tag over said sub-window;
   the maximum value of the RSSI level of the response signals of the tag over said sub-window;
   the standard deviation of the RSSI level of the response signals of the tag over said sub-window;
   the difference between the maximum value and the minimum value of the RSSI level of the response signals of the tag over said sub-window;
   the phase difference between the first and second interrogation signals and the response signals received over said sub-window.

The characteristic value can also be a combination of these various values or be extended to other characteristic values.

According to a particular embodiment, the sub-windows have distinct lengths. The length of these sub-windows is defined during the learning phase.

Upon reading the examples below, which are illustrated by the appended drawings and given for illustration purposes, other advantages could be clear to a person skilled in the art.

DETAILED DESCRIPTION OF THE EMBODIMENTS

Some embodiments discriminate between stationary tags and moving tags. In particular, some embodiments filter the stationary tags having a response signal close to that of a moving tag.

In UHF, the RSSI level of a response signal of a moving tag generally varies according to the distance that separates it from the reading station. Conventionally, it has a peak when the tag passes through the equatorial plane of the antenna of the reading station. For stationary tags, the RSSI level of the response signal is more variable. Certain stationary tags, called "easy", have a rather stable response signal (without an RSSI peak). These tags are easy to discriminate. Other stationary tags, called "difficult", can have, at a given moment, an RSSI curve substantially similar to that of a moving tag (because of constructive interference). The presence of difficult stationary tags is frequent in indoor environments (inside a building). These constructive interference phenomena are random phenomena. Therefore, this means that if this phenomenon appears at a reading point, the probability of it also occurring at another reading point is low.

For this reason, according to some embodiments, using at least two reading points along the path of the moving tags is proposed, in order to carry out a first filtering of the tags that are only read by one reading station. This allows a portion of the difficult stationary tags having a response signal that should not normally be read by the reading stations but which, via a phenomenon of constructive interference, respond to one of the reading stations to be initially filtered. Then, a shape recognition method (for example kNN, k-nearest neighbours' method) is applied to the tags read by both reading stations in order to discriminate, among the remaining tags, between the moving tags and the stationary tags.

Figure 1:
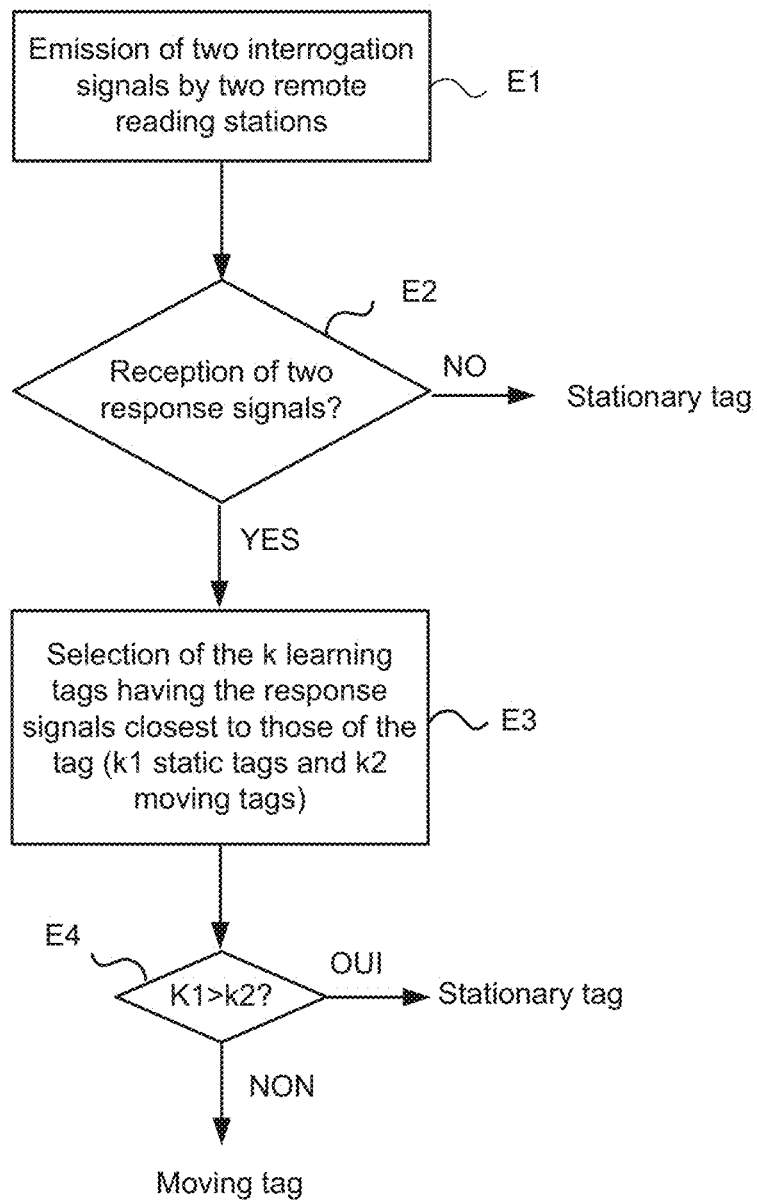
FIG. 1 shows a flowchart of the steps of the method of some embodiments.

FIG. 1 shows a flowchart of the method of some embodiments.

According to a first step of some embodiments, labelled E1, two remote reading stations A and B positioned along the path of the moving tags each emit their own interrogation signal. The reading stations A and B are spaced apart by a distance d and emit their interrogation signal on their own frequency channel, for example 865.7 MHz for station A and 866.9 MHz for station B.

Figure 2:
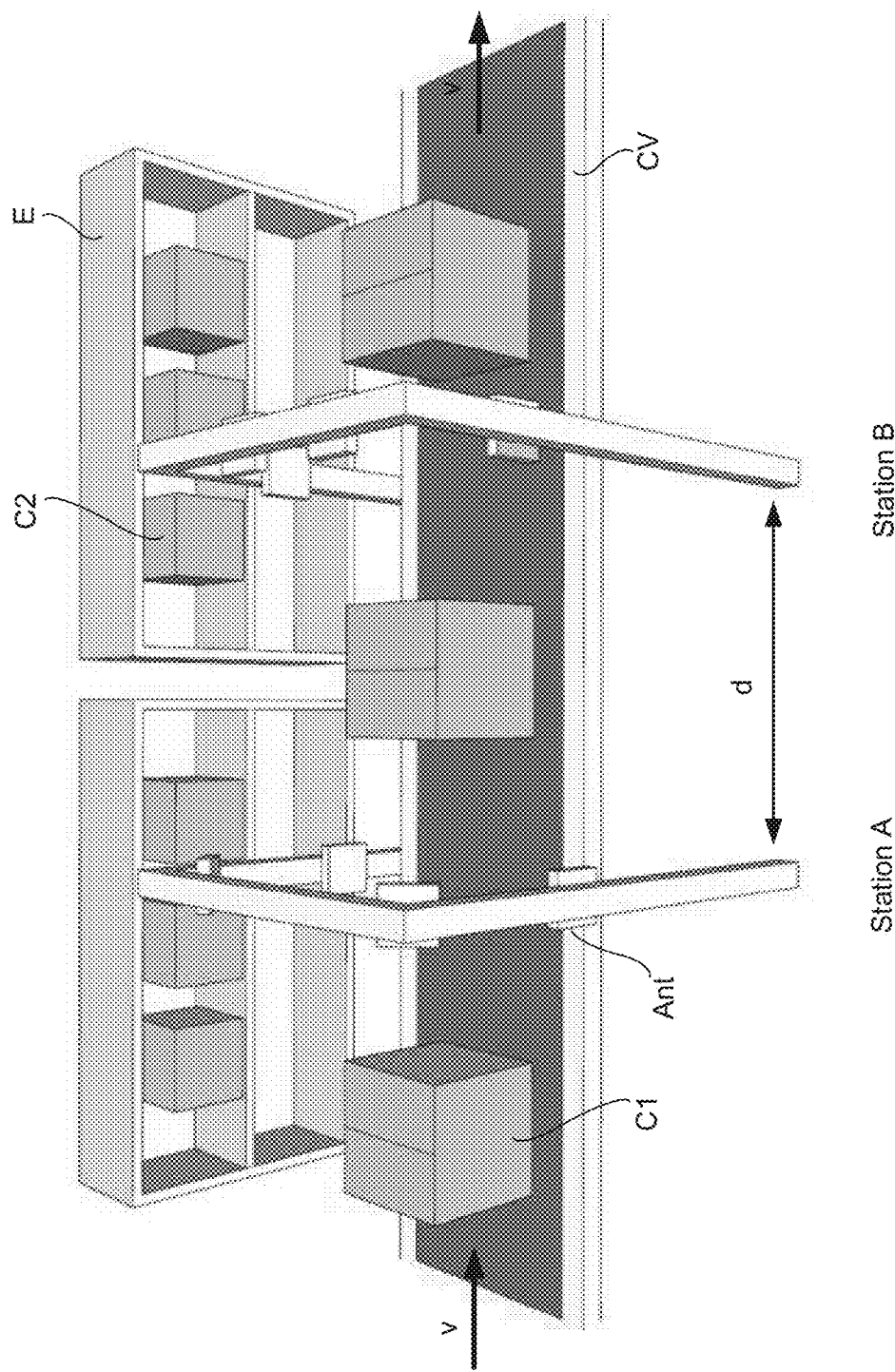
FIG. 2 is an example of a device for implementing the method of some embodiments.

Such a configuration of the reading stations is represented schematically in FIG. 2. Boxes C1 of moving tags are placed on the conveyor belt of a conveyor CV moving at a constant speed V. The stations A and B are positioned along the conveyor and are separated by a distance d. The stations are schematically represented by two arches through which said conveyor passes, these arches carrying the antennas ANT of the reading stations. Other boxes C2, placed on shelves E positioned near the conveyor, contain stationary tags. Other boxes C2 not shown in the drawing and placed at a greater distance from the reading stations are also present. The purpose of some embodiments is to discriminate between the moving tags in the boxes C1 and the stationary tags in the boxes C2.

When the stations A and B each emit their interrogation signal, the tags that pick up these stations respond to these interrogation signals by sending back a response signal on the same frequency channel. In the rest of the description, first interrogation signal designates the interrogation signal emitted by the station A and second interrogation signal designates the interrogation signal emitted by the station B.

According to a second step, labelled E2 in the flowchart of FIG. 1, a first sorting of the tags is carried out by noting the tags for which only one of the two reading stations received a response signal. These tags are stationary tags.

For the tags for which the stations each received a response signal, a k-nearest neighbours' method is applied to these tags in order to determine whether they are stationary tags or moving tags. According to this method, the response signals received are compared to response signals of tags having a state, stationary or moving, that is known. The state of the current tag can then be deduced on the basis of the tags having a response signal close to that of the current tag.

Figure 3A:
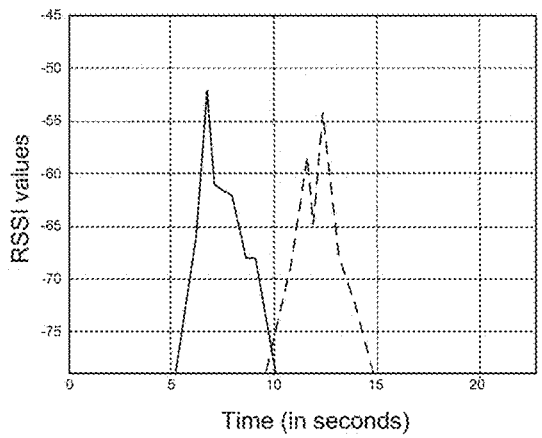
FIGS. 3A to 3C are examples of RSSI curves of moving or stationary tags.
Figure 3B:
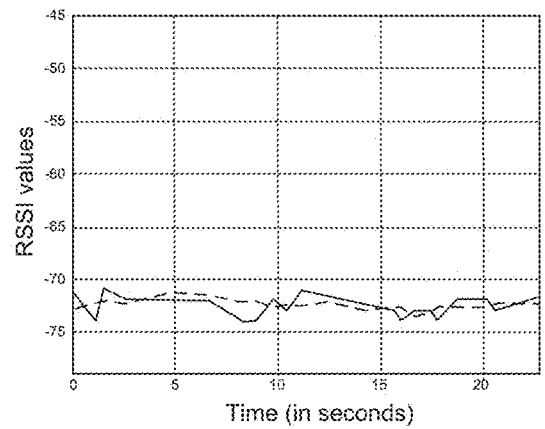

FIGS. 3A and 3B show response signal curves of moving tags and easy stationary tags. These curves represent the RSSI level of the response signals over time. The response signal received by the station A is shown with a solid line and the response signal received by the station B is shown with dashes.

FIG. 3A shows the response signals received by the stations A and B for a conventional moving tag. Each of these signals includes an RSSI peak. The RSSI peak of the first response signal (solid line) corresponds to the passage of the tag through the equatorial plane of the antennas of the station A and the RSSI peak of the second response signal (dashes) corresponds to the passage of the tag through the equatorial plane of the antennas of the station B. The difference in time between these two peaks is dependent on the speed of the conveyor and the distance between the two stations.

FIG. 3B shows the response signals received from an easy stationary tag. The two response signals do not have an RSSI peak and are quasi-stable.

Figure 3C:
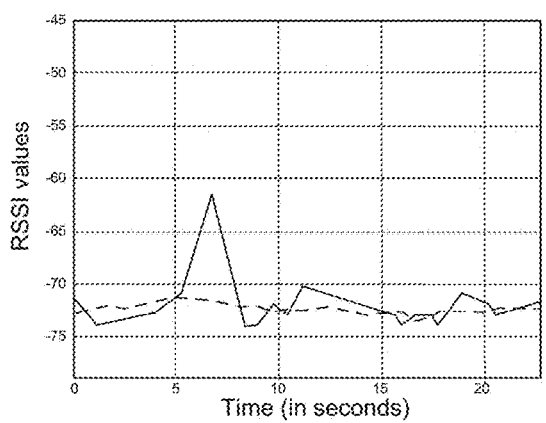

FIG. 3C illustrates the case of a tag having a state that is more difficult to determine since one of the response signals has an RSSI peak and the other response signal is stable.

The kNN method allows, regardless of the response signals received for a tag, the determination of its state on the basis of the state of its nearest neighbours, k being an integer greater than or equal to 1.

The kNN method proposed substantially includes a previous learning step, a step of selecting k learning tags and a step of determining the stationary or moving state of the current tag on the basis of the state of the k selected learning tags.

The learning step is previously carried out offline and does not therefore appear in the flowchart of FIG. 1. It is carried out on a population of N tags, called learning tags, the state of which, stationary or moving, is known in advance. This learning step is carried out in the location in which the method of some embodiments will be implemented, with the same reading stations and preferably under the same conditions of use. For each of these learning tags, the response signals received by the reading stations A and B are recorded.

According to a particular embodiment, the response signals recorded are for example files of points representative of the RSSI curve of the response signals of the tag in a time window having a predetermined length synchronised on a predetermined time reference. The file of points of a tag includes, for example, pairs (RSSI level of the point, date of the point) for various points of the two RSSI curves corresponding to the two response signals received for the tag in the chosen time window.

The length of the time window is determined on the basis of the speed of the moving tags and/or the minimum distance between the reading stations. Moreover, the time reference is, for example, the crest of the first RSSI peak, the beginning of the time window then being set with respect to this time reference. For example, a time window having a length of 20 seconds and the beginning of which begins 5 seconds before the first RSSI peak can be defined.

The time reference can also be provided by the passage of a box C1 in front of a photoelectric cell placed upstream of the first reading station (station A).

The step of selecting k learning tags, labelled E3 in FIG. 1, involves selecting the k learning tags having the response signal closest to the response signals of the current tag according to a predetermined distance criterion. The integer k is advantageously an odd number.

In order to carry out this selection, the response signals of the current tag and the response signals of the N learning tags are compared over the predetermined time window. The signals are compared by comparing their files of points.

The files of points are the union of points of the response signal received by the station A and the points of the response signal received by the station B. If two points have the same date, a point is optionally generated that is the average of the two points having the same date, or they are kept.

According to a particular embodiment, the time window is divided into M distinct sub-windows. The comparison step is then carried out over each of the sub-windows. These sub-windows are preferably defined during the learning step. Each of the sub-windows is advantageously determined in order to include an entire peak or no peak.

In order to carry out the comparison, in a first substep, a characteristic value is calculated, representative of the two response signals received for the tag in question during each of the M sub-windows. This statistical value is, for example, the average of the RSSI level over said sub-window, the maximum value of the RSSI level over this sub-window, the standard deviation of the RSSI level of the response signals of the tag over said sub-window, or the difference between the maximum value and the minimum value of the RSSI level of the response signals of the tag over said sub-window.

Other characteristic values not related to the RSSI level can be used, such as the phase difference between the interrogation signals and the response signals received. This phase difference varies when the tag is moving.

For the learning tags, this step of calculating a characteristic value is advantageously carried out during the learning phase.

According to a second substep, a distance is calculated between the statistical values of the response signals of the current tag and the statistical values of the response signals of the N learning tags.

This distance is, for example, a Euclidean distance, a Minkowski distance or a Mahalanobis distance.

Let us consider the example of a time window comprising 5 sub-windows. $a_i$ designates the characteristic value of the response signals received for the current tag during the $i^{th}$ time sub-window, with $i \in (1,2,3,4,5)$. $b_i$ designates the statistical value of the response signals received for a learning tag during the $i^{th}$ time sub-window.

The following Euclidean distance e is calculated between the current tag and each of the N learning tags:

$$e = \sqrt{|a_1-b_1|^2 + |a_2-b_2|^2 + |a_3-b_3|^2 + |a_4-b_4|^2 + |a_5-b_5|^2}$$

It should be noted that if in certain sub-windows, the RSSI level is too low to be measured, these sub-windows are assigned a predefined characteristic value, called replacement characteristic value, the value of which is defined in order to not have too much impact on the Euclidean distance calculated.

After the step of calculating the Euclidean distance, the k=k1+k2 learning tags having the lowest distance e are selected. The state, stationary or moving, of these learning tags is known. k1 designates the number of tags out of the k learning tags that are stationary. k2 designates the number of tags out of the k learning tags that are moving. Since k is preferably an odd number, k1 is different than k2.

Figure 4:
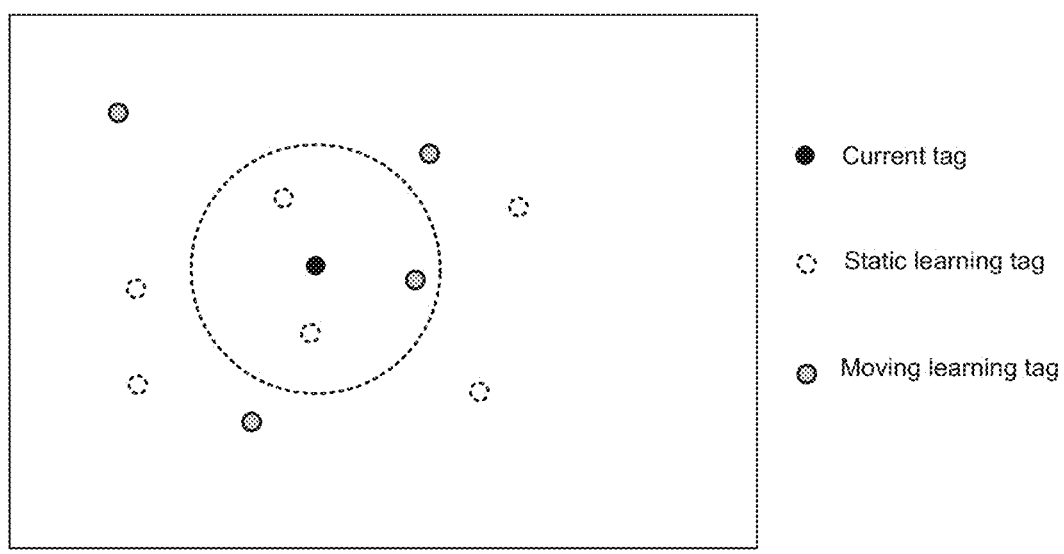
FIG. 4 is a diagram illustrating the k-nearest neighbours' method.

Finally, if k1>k2 (step E4 in FIG. 1), the current tag is considered to be stationary, and if k1<k2, the current tag is considered to be moving. This determination of the state of the current tag is illustrated by the diagram in FIG. 4. It is supposed that k=3. The 3 learning tags having the response signals closest to the response signals of the current tag are selected. In the example of FIG. 4, 2 learning tags out of the three learning tags selected are stationary tags. Consequently, the current tag is considered to be a stationary tag.

Alternatively, the state, stationary or moving, of the current tag is determined on the basis of the Euclidean distance with the k learning tags. In this case, k is indifferently even or odd.

Let us consider the example of k=3 learning tags. The calculated Euclidean distances e between the current tag and these 3 learning tags are the following:

Moving learning tag 1: e=0.23.
Stationary learning tag 2: e=5.34.
Stationary learning tag 3: e=3.22.

Although out of the 3 closest learning tags, two are stationary, the current tag is considered to be a moving tag since the distance separating it from the moving learning tag 1 is much greater than those separating it from the learning tags 2 and 3 that are stationary.

Of course, in this embodiment, k can be an even integer.

The embodiments described above were given as examples. It is obvious to a person skilled in the art that they can be modified, in particular with regard to the type of response signal curve analysed, the distance criterion used, the number of learning tags used.

In particular, phase variation curves could be used instead of RSSI-level curves in order to determine the state of the tags.

Moreover, some embodiments were described in the context of moving tags moved by a conveyor. Of course, in other uses, the moving tags can be moved by any other means, for example a vehicle or a cart.

Some embodiments were also described with an embodiment using a k-nearest neighbours' method as the method for recognition via learning. Of course, any other recognition method can be used instead of the kNN method.

The invention claimed is:

1. A method for processing a plurality of RFID tags, intended to discriminate between moving tags and stationary tags, the method comprising:
   transmitting, from first and second remote reading stations placed along the path of the moving tags, a first and a second radiofrequency interrogation signal to said plurality of RFID tags,
   determining whether said first and second reading stations receive response signals from tags in response to said first and second radiofrequency interrogation signals, respectively, in such a way that, for a current tag, if only one of said first and second reading stations receives a response signal from said current tag, said current tag is a stationary tag, and if said first and second reading stations each receive a response signal from said current tag, a k-nearest neighbors method, k being an integer greater than or equal to 1, is used to determine whether the current tag is stationary or moving,
   which k-nearest 'neighbors' method includes:
      learning on a population of N tags, called learning tags, the state of which, stationary or moving, is known, wherein a signal representative of the response signals received by said first and second reading stations for each of said N learning tags are recorded,
      selecting the k learning tags having the recorded response signals that are the closest to the response signals received for a current tag according to a predetermined distance criterion, and
      determining the stationary or moving state of the current tag on the basis of the state of the k learning tags selected.

2. The method according to claim 1, wherein k is an odd number.

3. The method according to claim 1, wherein, in order to select the k learning tags, said response signals of the current tag and the response signals of the N learning tags are compared over a time window having a predetermined length synchronized on a predetermined time reference.

4. The method according to claim 3, wherein the length of the time window is determined on the basis of the speed of the moving tags and/or their minimum distance with said first and second reading stations.

5. The method according to claim 3, wherein the time reference is the crest of a peak of the RSSI level of the response signals and the time window is centered on said crest.

6. The method according to claim 3, wherein the time reference is provided by a device upstream of said first and second reading stations, said time reference marking the beginning of the time window.

7. The method according to claim 3, wherein the time window is divided into M sub-windows, the learning step further comprises, for each of the learning tags, a step of calculating characteristic values representative of the response signals received during each of said M sub-windows by said first and second reading stations, and the step of comparing the response signals of a current tag and the response signals of the learning tags comprises:

calculating, for the current tag, characteristic values representative of the response signals received during each of said M sub-windows by said first and second reading stations, and calculating distance between the characteristic values of the current tag and the stationary values of each of the N learning tags, the k learning tags selected being the k learning tags having the smallest calculated distances.

8. The method according to claim 7, wherein the characteristic value calculated for each of the sub-windows belongs to the following group:

the average of the RSSI level of the response signals of the tag over said sub-window;

the maximum value of the RSSI level of the response signals of the tag over said sub-window;

the standard deviation of the RSSI level of the response signals of the tag over said sub-window;

the difference between the maximum value and the minimum value of the RSSI level of the response signals of the tag over said sub-window;

the phase difference between the first and second interrogation signals and the response signals received over said sub-window.

9. The method according to claim 7, wherein the sub-windows have distinct lengths.

\* \* \* \* \*